EDWIN ADISON RICHMOND
IMPROVED
PISTON ROD METAL RING PACKING GLAND

108188

ASSIGNED TO
RICHMOND & WATSON

PATENTED OCT 11 1870

United States Patent Office.

EDWIN ADISON RICHMOND, OF SAN FRANCISCO, CALIFORNIA, ASSIGNOR TO HIMSELF AND CHARLES WATSON, OF SAME PLACE.

Letters Patent No. 108,188, dated October 11, 1870.

IMPROVEMENT IN PISTON-ROD PACKING.

The Schedule referred to in these Letters Patent and making part of the same

*To all whom it may concern:*

Be it known that I, EDWIN ADISON RICHMOND, of the city and county of San Francisco and State of California, have invented a certain new and improved Piston-rod and Valve-rod Metal-ring Packing-Gland; and I do hereby declare that the following is a full, clear, and exact description of the same, reference being had to the accompanying drawing and letters of reference marked thereon, making a part of this specification, in which—

Figure 1:
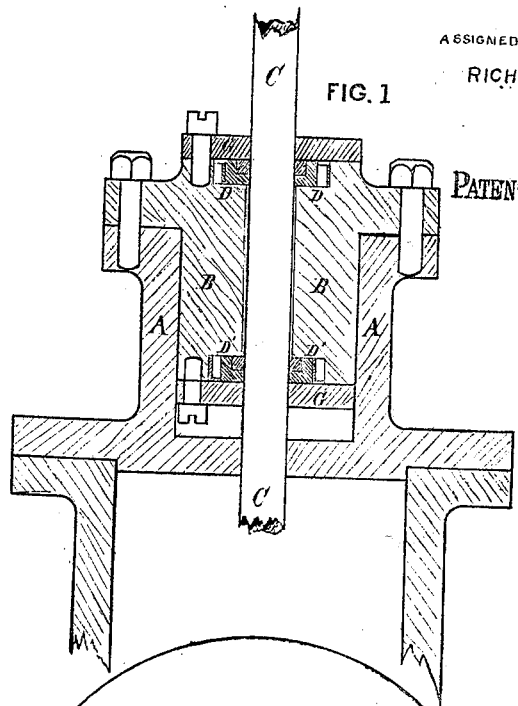
Figure 2:
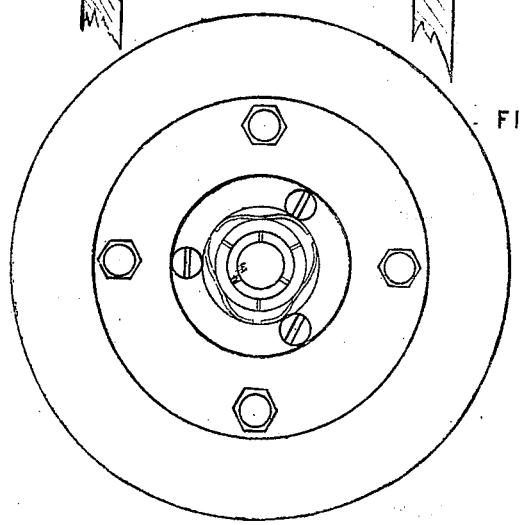

Figure 1 is a sectional elevation, and
Figure 2 is a plan of my device.

The invention is for the purpose of securing a perfectly steam and water-tight packing for working-rods of machines, such as piston-rods of steam-engines and pumps, valve-rods, &c.

There are parts of the device which have been in use before, my invention extending only to certain additional improvements.

To enable others skilled in the art to make and use my invention, I will proceed to describe it, as follows:

In the old style of stuffing boxes, in which fibrous packing is used, there is the stuffing-box, and the gland.

The gland is in one solid piece, and is made to slide within the stuffing or packing-box, by screwing up bolts, connecting their respective flanges together. When the gland is pressed into the packing-box, the packing is forced compactly against the rod, and thus a steam-tight joint is obtained.

For my improved metal-ring packing gland, there is a similar packing-box, A, and also a gland, B.

This gland is no longer adjustable in the box A, but is simply set in the box, and remains there in one position, being secured by bolts passing through the flanges of the packing-box and gland, as shown in fig. 1, a steam-tight joint being made between the two flanges.

The rod C passes through the gland B, and at the upper and lower end of this gland there will be recesses or chambers cut out, as at D D', which recesses will contain the metal packing-rings.

These packing-rings are not of themselves new, for they are in common use to the knowledge of the inventor below subscribed; however, they may be described as two rings, each being cut into three equal arc-shaped pieces.

One of the rings has an L-shaped section, which may be called the outer ring, and the other ring, (the inner one,) has a square section, and fits within the recess of the outer ring. This inner and smaller ring is set within the outer L-shaped ring, so that its cuttings or joints will come about midway between the joints or cuttings in the outer ring, one ring overlapping the joint of the other; thus no leakage can occur. (See fig. 2.)

To keep the rings always relatively in the same position, (and to prevent them from working round until their joints, arriving opposite each other, shall allow steam to pass through,) there is provided a small pin, E, projecting inward from the outer ring, and which inserts itself between a cut in the inner ring.

There are three elliptic springs, F, which, bracing their ends against the sides of the recess, (which they in part occupy, bear with their center part against the outer packing-ring, and press both inner and outer rings tightly against the rod, so that steam may not pass by them.

These packing-rings will be inclosed in their respective chambers by caps or covers G G', which are secured over each end of the gland by tap-bolts, as shown.

There was a patent, No. 37,663, granted to one John Johnson, in 1863, for a piston-rod packing somewhat similar to mine, but his idea seems to have been to use steam to press forward the rings, and he only provides a single set of rings at the inner end of the gland.

There have been found to be disadvantages connected with Johnson's packing-gland, which I have endeavored to overcome. One of the most particular objections is, that the packing cannot be kept perfectly tight, and frequently leaks steam, there not being sufficient bearing in his single set of rings to properly pack the rod. It has also been my experience that steam is not as effective as springs, to press forward the packing-rings; however, this is only a matter of opinion; there are those who hold a different view.

I will not claim the peculiar style or shape of the packing-rings used, nor the application of the springs to set forward the rings; nor will I claim a packing-gland wherein only one set of rings is used, in one end of the gland, for such a gland the above-named Johnson has produced; but What I have found to be a valuable improvement on Johnson's gland, and What I shall claim as my invention, and desire to secure by Letters Patent, is as follows:

As an improvement on Johnson's packing-gland, herein mentioned, the application of an additional set of rings at the outer end of the gland, said rings being "set up" with springs, as shown, and to operate in combination with the inner set of rings, as and for the purpose as set forth.

EDWIN ADISON RICHMOND.

Witnesses:
GEO. PARDY,
EDWARD H. FREEMAN.